United States Patent
Chakraborty et al.

(10) Patent No.: US 11,093,848 B2
(45) Date of Patent: Aug. 17, 2021

(54) PREDICTIVE ENGINE FOR GENERATING MULTIVARIATE PREDICTIVE RESPONSES

(71) Applicant: TIBCO Software Inc., Palo Alto, CA (US)

(72) Inventors: Sayan Chakraborty, Tulsa, OK (US); Daniel Scott, Broken Arrow, OK (US)

(73) Assignee: TIBCO SOFTWARE INC., Palo Alto, CA (US)

( * ) Notice: Subject to any disclaimer, the term of this patent is extended or adjusted under 35 U.S.C. 154(b) by 317 days.

(21) Appl. No.: 16/141,635

(22) Filed: Sep. 25, 2018

(65) Prior Publication Data
US 2019/0095810 A1    Mar. 28, 2019

Related U.S. Application Data

(60) Provisional application No. 62/563,971, filed on Sep. 27, 2017.

(51) Int. Cl.
*G06N 7/00* (2006.01)
*G06N 5/00* (2006.01)

(52) U.S. Cl.
CPC ............. *G06N 7/005* (2013.01); *G06N 5/003* (2013.01)

(58) Field of Classification Search
CPC ................................ G06N 5/003; G06N 7/005
See application file for complete search history.

(56) References Cited

U.S. PATENT DOCUMENTS

2011/0112998 A1* 5/2011 Abe .................. G06N 7/005
                                                    706/13
2017/0200265 A1* 7/2017 Bhaskar ................ G03F 1/84

OTHER PUBLICATIONS

"Adaptive Estimation in Multivariate Response Regression With Hidden Variables", by Bing et al.; arXiv.org: 2003.13844 (Year: 2021).*

* cited by examiner

*Primary Examiner* — Roy Y Yi
*Assistant Examiner* — Geoffrey T Evans
(74) *Attorney, Agent, or Firm* — McGuireWoods LLP

(57) ABSTRACT

A predictive engine includes an optimizer and a predictor. The optimizer is configured to receive an observed dataset having inputs and multivariate responses and determine latent response variables based on the predictive inputs and the multivariate responses. The optimizer is further configured to select latent response variables, measure dependencies between multivariate responses, estimate coefficients that relate the input predictors to determined latent response variables, and correlate dependencies and coefficients with the latent response variables. The predictor is configured to generate a predictive distribution of probabilities for the latent variables, map the probabilities to multivariate responses, generate a predictive distribution of probabilities for the multivariate responses, and determine at least one optimized input from the multivariate responses.

19 Claims, 10 Drawing Sheets

FIG. 3B-1
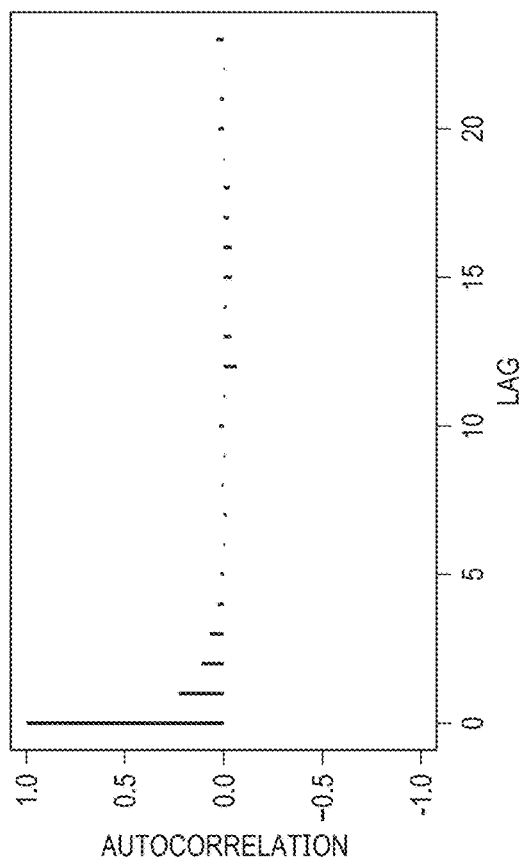
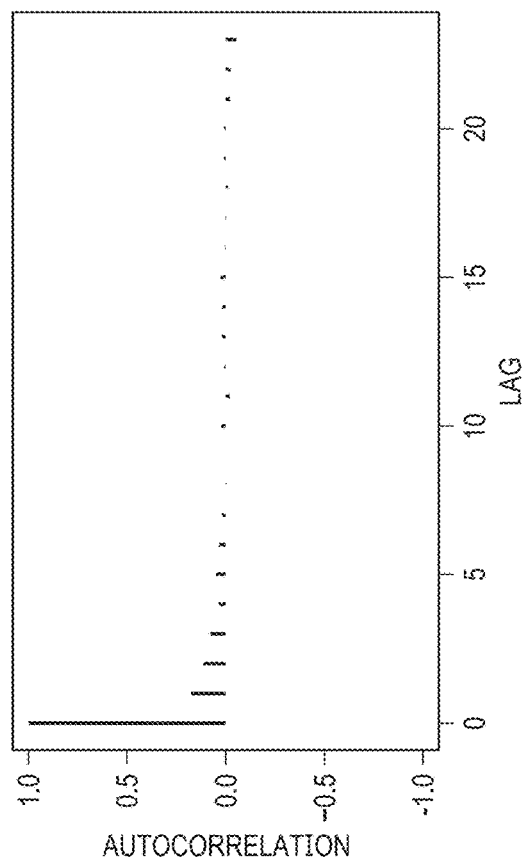
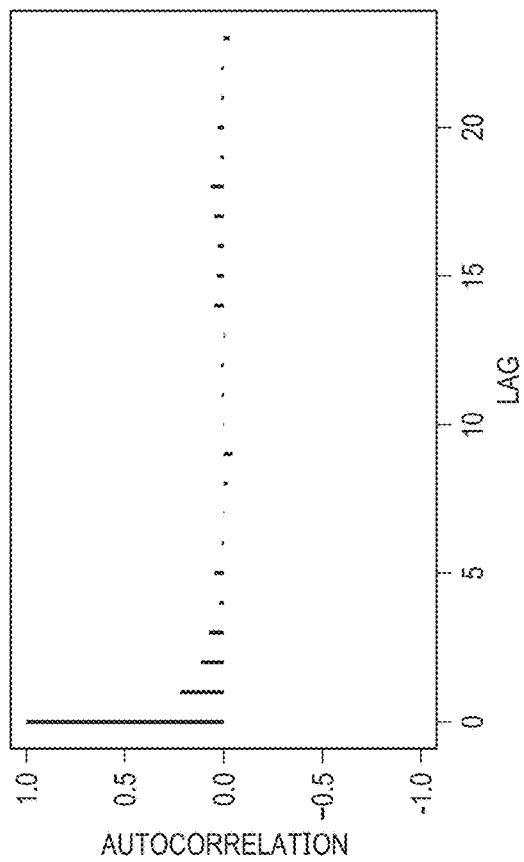
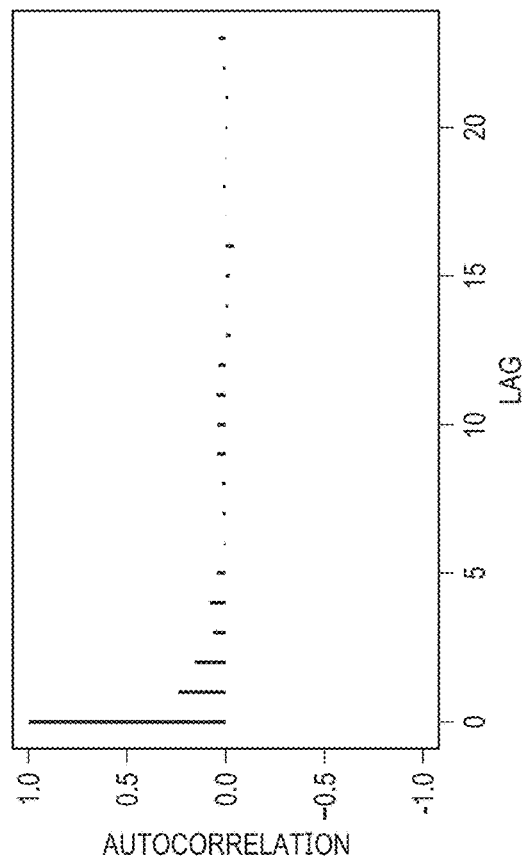

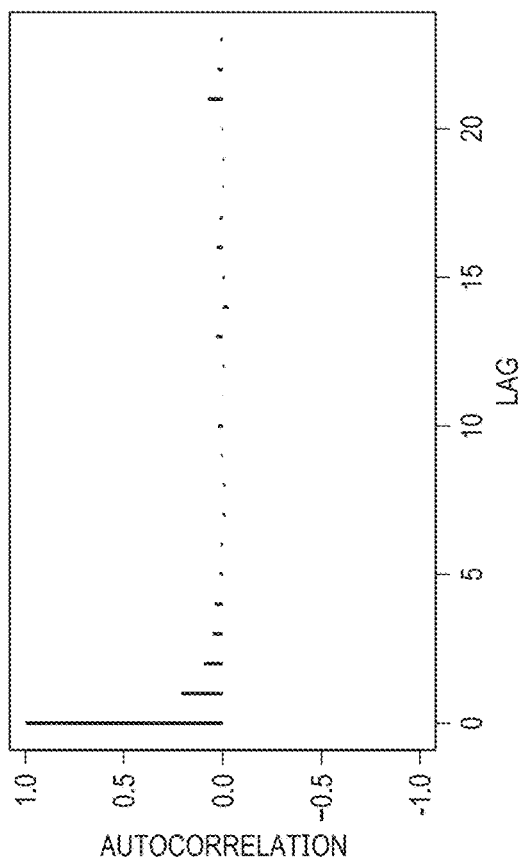
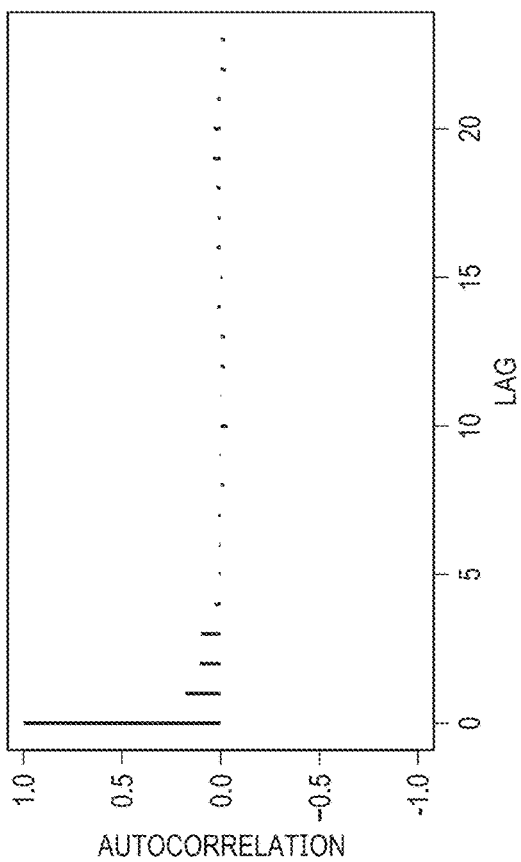
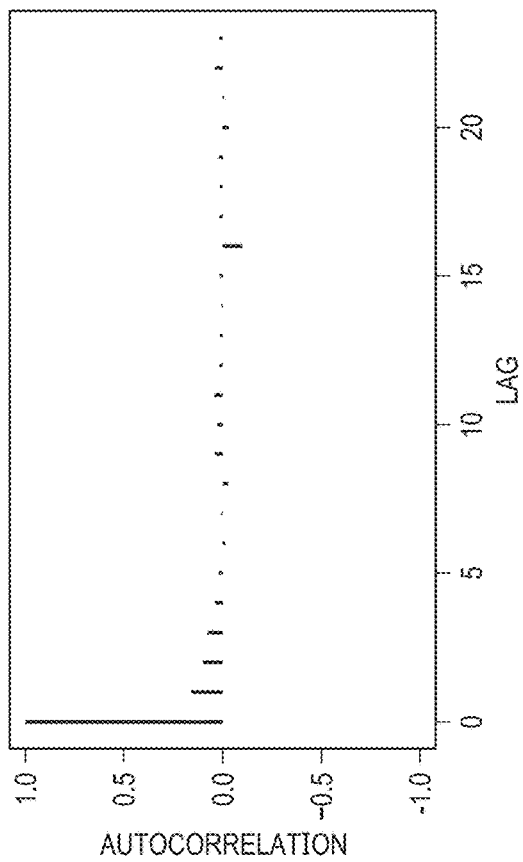
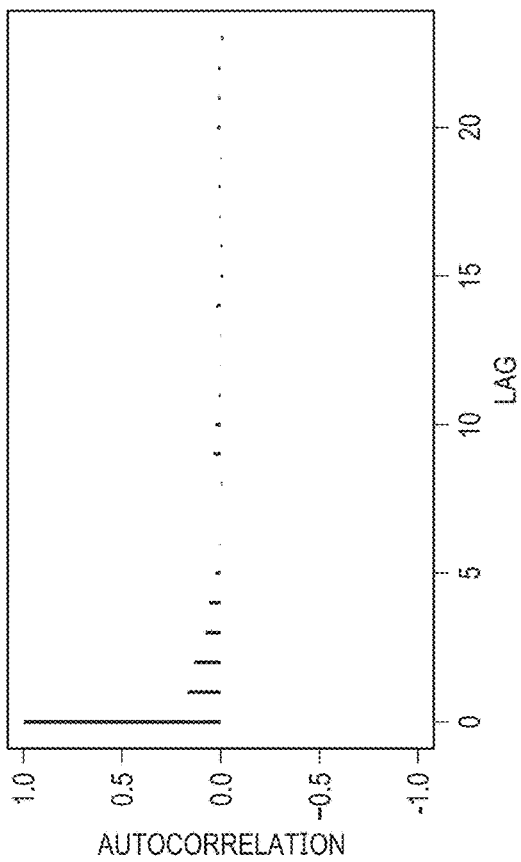
FIG. 3B-2

| COVARIATES | $y_1$ | $y_2$ | $y_3$ |
|---|---|---|---|
| INTERCEPT | 0.388107 | -0.23446 | -0.45348 |
| $x_1$ | -0.19421 | -0.22327 | -0.08863 |
| $x_2$ | -0.27888 | -0.42154 | -0.00405 |
| $x_3$ | 0.27665 | -0.43752 | 0.16647 |
| $x_4$ | 0.07281 | -0.14129 | -0.41661 |
| $x_5$ | 0.14889 | 0.14572 | -0.28989 |
| $x_1 x_2$ | -0.46959 | -0.06803 | 0.09909 |
| $x_1 x_3$ | -0.46483 | 0.25307 | 0.31606 |
| $x_1 x_4$ | -0.05085 | -0.48013 | 0.36415 |
| $x_1 x_5$ | -0.04651 | 0.25022 | 0.15794 |
| $x_2 x_3$ | 0.114258 | 0.26989 | -0.18978 |
| $x_2 x_4$ | 0.30119 | -0.00713 | 0.20135 |
| $x_2 x_5$ | 0.17896 | -0.48578 | -0.12737 |
| $x_3 x_4$ | 0.44510 | -0.08644 | 0.35822 |
| $x_3 x_5$ | 0.14442 | -0.48677 | -0.38443 |
| $x_4 x_5$ | -0.49158 | 0.08179 | -0.40416 |

FIG. 4A

| COVARIATES | $y_1$ | $y_2$ | $y_3$ |
|---|---|---|---|
| INTERCEPT | 0.34604(-0.11212) | -0.38784(-0.57180) | -0.45293(1.28526) |
| $x_1$ | -0.16649(0.96785) | -0.94561(-0.40638) | 0.00755(0.38965) |
| $x_2$ | -0.28053(0.0.19622) | -0.27266(0.0.17813) | -0.39829(-0.82402) |
| $x_3$ | 0.49028(-1.11020) | -0.40402(0.89770) | 0.19362(-0.36783) |
| $x_4$ | 0.13212(0.24512) | 0.01496(-1.48029) | -0.43559(0.78214) |
| $x_5$ | 0.24187(-1.03254) | 0.00927(0.55192) | -0.21134(-1.06082) |
| $x_1 x_2$ | -0.35518(0.09125) | -0.19972(1.04044) | -0.00131(0.78449) |
| $x_1 x_3$ | -0.34136(-1.27221) | 0.38820(0.52100) | 0.21234(-1.26620) |
| $x_1 x_4$ | 0.04031(-0.26135) | -0.38868(0.18773) | 0.41726(-0.89546) |
| $x_1 x_5$ | 0.03406(1.02003) | 0.40674(0.16239) | 0.17845(0.36976) |
| $x_2 x_3$ | -0.14451(0.69536) | 0.62541(0.0.64980) | -0.20136(0.15692) |
| $x_2 x_4$ | 0.33649(0.56497) | 0.22698(-0.0.30365) | 0.37316(0.13669) |
| $x_2 x_5$ | 0.13622(-1.26942) | -0.54623(0.55638) | -0.16667(-0.06231) |
| $x_3 x_4$ | 0.62216(0.0.58762) | -0.39444(0.38841) | 0.55030(0.78882) |
| $x_3 x_5$ | 0.08080(0.06433) | -0.41291(-0.11766) | -0.30994(-0.46660) |
| $x_4 x_5$ | -0.70652(1.02351) | 0.02154(0.03365) | -0.63537(-0.59599) |

FIG. 4C

| COVARIATES | $y_1$ | $y_2$ | $y_3$ | $y_4$ |
|---|---|---|---|---|
| *INTERCEPT* | −0.746(0.152) | 0.702(0.141) | 1.339(0.147) | 1.098(0.174) |
| $x_1$ | 0.093(0.144) | −0.272(0.150) | −0.346(0.174) | −0.092(0.172) |
| $x_2$ | 0.260(0.134) | 0.269(0.126) | 0.317(0.178) | 0.522(0.148) |
| $x_3$ | −0.890(0.150) | −0.922(0.172) | −0.321(0.125) | −0.326(0.142) |
| $x_4$ | −0.114(0.155) | −0.153(0.122) | 0.097(0.169) | 0.068(0.124) |
| $x_5$ | 0.274(0.142) | 0.085(0.147) | −0.097(0.157) | 0.496(0.166) |
| $x_1 x_2$ | 0.365(0.111) | 0.177(0.164) | 0.292(0.176) | 0.122(0.144) |
| $x_1 x_3$ | −0.083(0.140) | −0.278(0.158) | −0.313(0.120) | 0.119(0.171) |
| $x_1 x_4$ | −0.167(0.124) | 0.036(0.148) | 0.105(0.153) | 0.122(0.138) |
| $x_1 x_5$ | −0.039(0.176) | −0.118(0.106) | −0.093(0.155) | 0.110(0.172) |
| $x_2 x_3$ | −0.228(0.152) | 0.240(0.138) | 0.299(0.169) | 0.302(0.180) |
| $x_2 x_4$ | 0.067(0.164) | 0.362(0.150) | −0.116(0.149) | −0.121(0.156) |
| $x_2 x_5$ | −0.375(0.133) | 0.126(0.108) | 0.106(0.176) | −0.527(0.166) |
| $x_3 x_4$ | 0.086(0.153) | −0.140(0.129) | 0.134(0.172) | −0.155(0.164) |
| $x_3 x_5$ | −0.248(0.144) | 0.072(0.155) | −0.116(0.157) | 0.300(0.152) |
| $x_4 x_5$ | −0.373(0.145) | −0.344(0.123) | −0.141(0.172) | −0.154(0.159) |

US 11,093,848 B2

PREDICTIVE ENGINE FOR GENERATING MULTIVARIATE PREDICTIVE RESPONSES

TECHNICAL FIELD OF THE DISCLOSURE

The present disclosure relates, in general, to Bayesian multivariate response optimization methods and, in particular, to a predictive engine for efficiently generating optimal multivariate binary and categorical predictive responses.

BACKGROUND

Response optimization methodology encompasses various statistical techniques that are commonly applied, after conducting one or more experiments, to build models for predicting a single or multiple outcome variables. A typical example might be the optimization of yield for a chemical process for which prediction models have been built based on one or more experiments. These experiments may have evaluated different input settings of temperature, pressure, ethanol concentrates and other inputs into the process. The optimization-of-outputs problem based on prediction functions determined through experimentation or statistical modeling of sampled data is not limited to the manufacturing domain: Rather, this is generally an important step whenever prediction models are to be used in order to change the inputs to a process to achieve optimal results. This general problem may occur in any domain, e.g., without limitation, education (e.g., evaluating different teaching strategies or supporting educational materials), healthcare (e.g., identifying the best combination of drugs and other treatment options to bring about desirable health improvements with minimum side effects), marketing (e.g., evaluating different types of incentives and discounts on propensity to purchase specific services), and elsewhere.

A common problem is to optimize multiple outputs simultaneously based on the same inputs. While the optimization of single outputs (response surface optimization) is widely described in Engineering Statistics text books, in most real world scenarios multiple outputs or measures of quality that depend on the same inputs must be simultaneously optimized. One solution to this multivariate output optimization problem that has been widely described in the Engineering literature is Response Profiling (Derringer, G., & Suich, R., 1980. Simultaneous optimization of several response variables. Journal of Quality Technology, 12, 214-219). In that solution, a simple arbitrary (based on domain/engineering expertise) combination of outputs that is deemed "desirable" is defined a-priori, and then optimized as a single univariate outcome using traditional response surface optimization methodology. However, response optimization only provides a crude and likely often inaccurate approximation of real-world dependencies among inputs and outputs of a process.

For example, multivariate outputs are highly dependent on each other and hence it is important to consider their correlation structure when performing the optimization. Also, traditional optimization methods cannot provide any certainty nor confidence (probability) estimates that describe how often the presumed "optimal" settings of inputs can in fact be expected to yield the desired optimized output values.

Peterson, J. J. (2004) "A posterior predictive approach to multiple response surface optimization" Journal of Quality Technology 36 139 (2004) introduced Bayesian optimization methods applied to certain types of continuous-only multivariate outcome problems. Bayesian optimization methods take into account the fact that in practice most outcomes of interest are correlated, and provide a way for a statement of confidence or probability to be derived regarding the expected outputs given optimized inputs. In addition, the application of certain Bayesian optimization methods on multivariate outcome problems can be computationally complex and expensive. For example, the Bayesian logistic regression model require the use of unknown probability functions, which in practice are computationally inefficient or impossible, and potentially very expensive. Moreover, this approach is not guaranteed to converge to an optimized solution, because the various necessary approximations during the computational process depend on the manual tuning of multiple underlying parameters.

SUMMARY

The present disclosure describes a predictive engine configured to efficiently optimize multivariate responses and determine an optimal input based on the optimized multivariate responses and a desired output.

In one aspect, the present disclosure is directed to a predictive engine for generating optimized multivariate responses, the optimized predictive engine comprising: an optimizer configured to receive an observed dataset having inputs and multivariate responses and determine latent response variables based on the inputs and the multivariate responses; and a predictor configured to generate a predictive distribution of probabilities for the latent variables, map the probabilities to multivariate responses, generate a predictive distribution of probabilities for the multivariate responses, and determine at least one optimized input from the multivariate responses.

In some embodiments, the optimizer is further configured to select latent response variables, measure dependencies between multivariate responses, estimate coefficients that relate the input predictors to determined latent response variables, and correlate dependencies and coefficients with the latent response variables. The dependencies are measured by creating a covariance matrix. The dependencies and coefficients are correlated with the latent response variables using joint posterior density distribution. In some embodiments, the optimizer is further configured to (i) initialize a latent response variable vector with respect to an input predictor and multivariate response vector, (ii) measure dependency between a latent response variable and a multivariate response, (iii) estimate a coefficient that relates an input predictor to the latent response variable, (iv) correlate the dependency measure and the estimate coefficient with the latent response variable, and (v) select a latent response variable. The dependency measure and the estimate coefficient is correlated with the latent variable using a joint posterior density distribution. The predictive engine repeats steps (ii)-(v) until convergence. The multivariate responses are one of multivariate binary responses and multivariate categorical responses. The predictive distribution is a posterior predictive distribution. The probabilities are mapped to the multivariate responses by generating a conditional distribution.

In another aspect, the present disclosure is directed to a method for generating optimized multivariate responses. The method receiving an observed dataset having inputs and multivariate responses; determining latent response variables based on the inputs and the multivariate responses; generating a predictive distribution of probabilities for the latent variables; mapping the probabilities to multivariate responses, generate a predictive distribution of probabilities for the multivariate responses; and determining at least one optimized input from the multivariate responses.

The method can also include selecting latent response variables; measuring dependencies between multivariate responses; estimating coefficients that relate the input predictors to determined latent response variables; and correlating dependencies and coefficients with the latent response variables. The method can further include (i) initializing a latent response variable vector with respect to an input predictor and multivariate response vector; (ii) measuring dependency between a latent response variable and a multivariate response; (iii) estimating a coefficient that relates an input predictor to the latent response variable; (iv) correlating the dependency measure and the estimate coefficient with the latent response variable; and (v) selecting a latent response variable. The method also include repeating steps (ii)-(v) until convergence.

In a further aspect, the present disclosure is directed to non-transitory computer readable storage medium comprising a set of computer instructions executable by a processor for generating optimized multivariate responses. The computer instructions are configured to receive an observed dataset having inputs and multivariate responses; determine latent response variables based on the inputs and the multivariate responses; generate a predictive distribution of probabilities for the latent variables; map the probabilities to multivariate responses, generate a predictive distribution of probabilities for the multivariate responses; and determine at least one optimized input from the multivariate responses.

Additional computer instructions can be configured to select latent response variables; measure dependencies between multivariate responses; estimate coefficients that relate the input predictors to determined latent response variables; and correlate dependencies and coefficients with the latent response variables. Additional computer instructions can be configured to (i) initialize a latent response variable vector with respect to an input predictor and multivariate response vector; (ii) measure dependency between a latent response variable and a multivariate response; (iii) estimate a coefficient that relates an input predictor to the latent response variable; (iv) correlate the dependency measure and the estimate coefficient with the latent response variable; and (v) select a latent response variable. The multivariate responses are one of multivariate binary responses and multivariate categorical responses.

Additional embodiments, advantages, and novel features are set forth in the detailed description.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIG. 3B-1 and FIG. 3B-2 illustrate autocorrelation plots for the MCMC samples generated from the posterior distributions of the model coefficients, in accordance with certain example embodiments;

FIG. 4A illustrates a table of true values for the model coefficients in B, in accordance with certain example embodiments;

FIG. 4C illustrates the posterior mean for the model coefficients along with the Geweke summary Z-scores for convergence diagnostics, in accordance with certain example embodiments;

FIG. 5B-1 and FIG. 5B-2 illustrate probability plots for the target response region over the domain of a covariate pairs when other covariates are set to their optimized values, in accordance with certain example embodiments;

DETAILED DESCRIPTION

Figure 1:
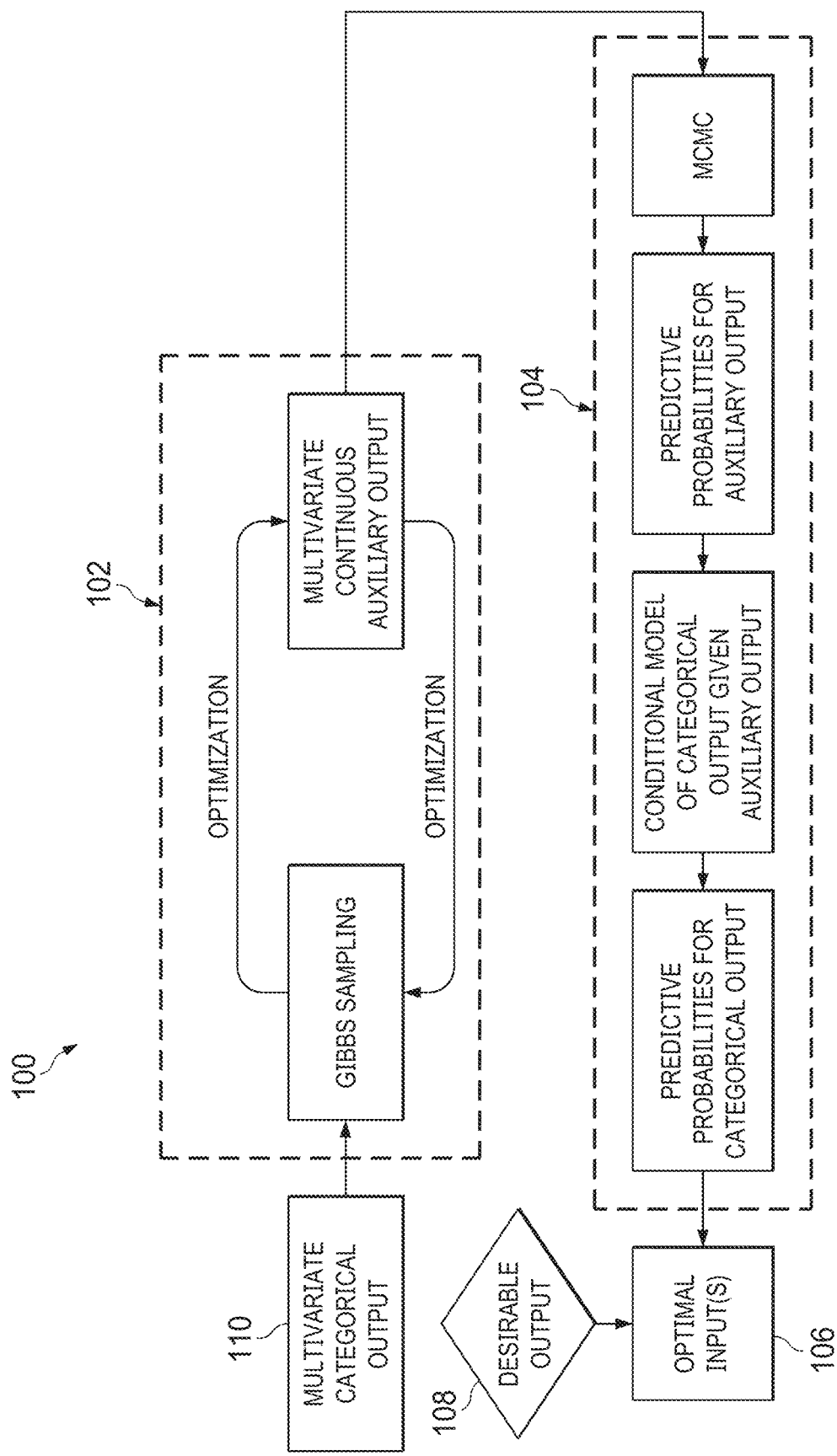
FIG. 1 is an illustration of a block diagram of a predictive engine, in accordance with certain example embodiments.

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

Peterson's (2004) approach is limited to continuous outcomes only, and no equivalent approach, computer system, or methodology exists that solves the more general problem of multiple categorical outcomes. Suppose in a medical application and experiment, different patients were administered different dosages of multiple drugs (inputs) to determine the optimal combination of dosages for different drugs that will minimize the risk of side effects (e.g., rashes; yes or no), fever (yes or no) while maximizing the expected pain relief (no pain, pain reduced, pain not reduced), and so on. This type of problem involving discrete outcomes are frequently observed across many different domains including but not limited to psychometric testing, chemical processes or drug development, general manufacturing, marketing, etc. In all cases the goal is to optimize probabilities for different ordered categorical outputs, based on a set of common inputs and the prediction functions that connect the outputs to the combination of values of the inputs.

To continue the medical-application example, the goal could be to identify the specific dosages for different drugs for a given diagnosis/disease to achieve optimal improvements of different symptoms while minimizing the probability of different side effects. For the reasons outlined previously, the traditional statistical techniques to solve such problems are either not applicable, nor can generate the desired and often required statements of confidence and risk for the optimized solution. Peterson's specific limited Bayesian optimization approach is only applicable for continuous outputs, so, that also falls short when trying to solve the common (across multiple domains) optimization problem for multiple ordered categorical outputs.

A typical non Bayesian solution specifically to the modeling and then optimization of models for categorical outputs is to apply certain transformations (such as the Arcsine transformation) to the respective proportions for each category for each output. Those transformations aim to approximate continuous variables that represent and "normalize" (turn into random-normal-variables) the underlying proportions. These approximations were proposed by statisticians in the 1950's, but are generally considered inappropriate in situations when underlying proportions are close to 0.0 or 1.0. Moreover, the problem of multiple categorical outputs is not solved, and how to optimize prediction models for such outputs based on common inputs.

Another theoretically possible solution to the optimization problem for multiple categorical outputs could also be derived from Bayesian logistic regression techniques. However, in practice this general approach is not feasible nor practical because of statistical and computational complexities and cost: The Bayesian logistic regression model requires to induces unknown probability functions that need to be approximated, which in practice is computationally inefficient or impossible, and potentially very expensive. Moreover, this approach is not guaranteed to converge to an optimized solution, because the various necessary approximations during the computational process depend on the manual tuning of multiple underlying parameters. For these reasons, this approach is not suitable to serve as the basic mathematical model to support a system and method for optimization of categorical outputs as described in this disclosure.

In various embodiments presented herein, Bayesian optimization of multiple categorical outcomes is performed based on a system of prediction models involving common inputs. This type of optimization problem occurs frequently in a wide variety of domains and industries. In various embodiments, known Bayesian methodologies and innovative data processing steps are combined to create an optimized representation of the categorical outputs through auxiliary latent intermediate continuous outputs.

In some embodiments, a Bayesian approach is used to treat an underlying prediction model as a classification problem, and then to iteratively generate an optimized representation of the categorical outputs over a continuous and separated (not overlapped) hyperplane. In this context, the data processing step that is disclosed involves the generation of auxiliary latent continuous outputs which are then used in Bayesian optimization following procedures that are similar to those proposed by Peterson. In addition, several heretofore unknown specific processing steps are disclosed, which when combined with other steps as disclosed herein enable the optimization of multiple categorical outputs—each with multiple categories—based on prediction models involving common inputs.

In various embodiments, techniques disclosed herein are implemented efficiently in a computer system as a number of consecutive data processing steps. Thus, optimization is achieved even in situations where there are many categorical outputs and models, and many categories for each output. Additional advantages of techniques disclosed herein, in various embodiments, include that the dependence among the categorical outputs is taken into consideration, and statements of probability and confidence may be derived regarding the expected outcomes given the optimized inputs. In various embodiments, more realistic and accurate predictions are created, and users are informed of the confidence probabilities associated with specific optimization results.

In general, the Bayesian reliability optimization described herein can be used to find the optimal set of inputs to maximize the probability of the desired output. This extends the already existing approach by Peterson (2004) where the optimal set of inputs for a set of continuous responses are found. Finding a set of optimal inputs that yield a desired set of outputs is not new, but Peterson's approach had the advantage over the traditional frequentist approach by (1.) incorporating the dependencies among the multiple responses, and (2.) providing a statement of confidence or probability regarding the expected outputs given optimized inputs. The disclosed approach presented herein applies these advantages to data with multiple ordered categorical outputs.

A predictive engine, method, and computer program product used in various embodiments to apply Bayesian optimization to optimize multiple categorical outputs is presented. It is able to optimize multiple ordered categorical outputs without ignoring the dependence among the outputs. It solves the optimization problem and provides uncertainty estimates (probabilities) of how likely the optimized input values will fail to generate the optimized outputs. It can be implemented efficiently as a set of computer instructions that can optimize the multiple categorical outputs based on prediction models involving multiple common inputs.

The underlying optimization induces known forms of probability models which make the disclosed method computationally efficient; even large optimization problems involving many categorical outputs with many categories can be solved using the methods presented herein, and solutions to problems can be derived that heretofore could not be addressed by any known system or method.

In a typical situation, an analyst may have data with multiple ordered categorical responses (or binary in which case there does not have to be an ordering present in the response) with a set of categorical and/or continuous predictors. For example, suppose in a medical application and experiment, different patients were administered different dosages of multiple drugs (inputs/predictors) to determine the optimal combination to minimize side effects e.g. rashes (yes/no), fever (yes/no), and maximize pain relief (no pain, pain reduced, pain not reduced). In this example, a partial listing of the data table might look like the following:

| Rashes | Fever | Pain relief | Drug 1 | Drug 2 | ... | Drug k |
|--------|-------|-------------|--------|--------|-----|--------|
| No | No | Pain reduced | 2,000 mg | 150 mg | ... | 100 mg |
| Yes | No | No pain | 4,000 mg | 150 mg | ... | 100 mg |
| ... | ... | ... | ... | ... | ... | ... |
| Yes | Yes | No pain | 2,000 mg | 200 mg | ... | 300 mg |

The first three columns represent the categorical responses or outputs. The final k columns display the predictors or inputs. For this example, the methods presented herein can be used to find the optimal set of inputs such that the probability of no rashes, no fever, and no pain is maximized and perform the optimization in a much more computationally efficient manner than previous approaches.

The categorical outputs can be modeled via latent continuous variables. The data can be transformed into a form suitable for the Bayesian approach put forth by Peterson. In other words, the problem can be transformed from one of categorical responses to a set of latent, continuous variables. The predictive engine is flexible and the modeling details can be filled in as desired. However, in further detail below are examples of concrete implementations, which illustrates how one might go about modeling the binary or categorical response (output) variables with latent continuous variables. The latent continuous variables can be modeled using Bayesian linear regression techniques. See paragraphs [0055]-[0072] for a more technical details. A function of the algorithms presented herein is the ability to be used with multivariate ordered categorical outputs. In the case of binary outputs, there is no real consequence of coding one category as "0" and another as "1." The range of the latent variable is simply divided into two halves. For multivariate ordered categorical outputs with more than two levels, the levels are ordered thus the mapping can now divide the range into three equiprobable intervals. See paragraph [0087] for a more technical details.

Referring now to FIG. 1, illustrated is a block diagram of a predictive engine, according to certain example embodiments, denoted generally as 100. In the embodiment, an observed dataset that includes sets of inputs, set of outputs (binary or categorical), and a desirable output or outputs can be provided. The observed dataset can include data from one or more experiments and can have also been previously optimized using another predictive algorithm. The predictive engine 100 functions efficiently and effectively to process and predict the optimal input or inputs for a desired output or outputs.

The predictive engine 100 includes an optimizer 102 and a predictor 104 for determining a set of optimal inputs 106 in order to achieve a desirable output 108. In this embodiment, to determine a set of optimal inputs 106 to achieve a desirable output 104, a set of observed multivariate categorical outputs 110, or multivariate binary outputs, is sampled and iteratively optimized to generate a multivariate continuous auxiliary output, at the optimizer 102. At the predictor 104, Bayesian optimization can be applied to the multivariate continuous auxiliary output to generate predictive probabilities, i.e. confidence ratings, for the auxiliary output. The MCMC acronym stands for Markov Chain Monte Carlo and can approximate the probability of desired output given some set of inputs, that is, P(y∈A|x). I.e., the determination which is being made outside of the MCMC is the optimal input which maximizes the probability of the desired output. A posterior prediction distribution function can be used to approximate probabilities. A conditional model can be used to generate categorical outputs from the given distribution of probabilities for the latent variables. The predictor 104 can then generate the predictive probabilities for the categorical outputs so that the optimal input, or inputs, for a desired output, or outputs, can be determined. In other words, P(y∈A|x) can then be approximated by sampling enough times to determine the categorical outputs. At this point, a generic numerical optimization algorithm can be implemented, e.g. some variant of Newton's method, grid search, etc., to search for the optimal input.

Figures 2A, 2B, 3A:
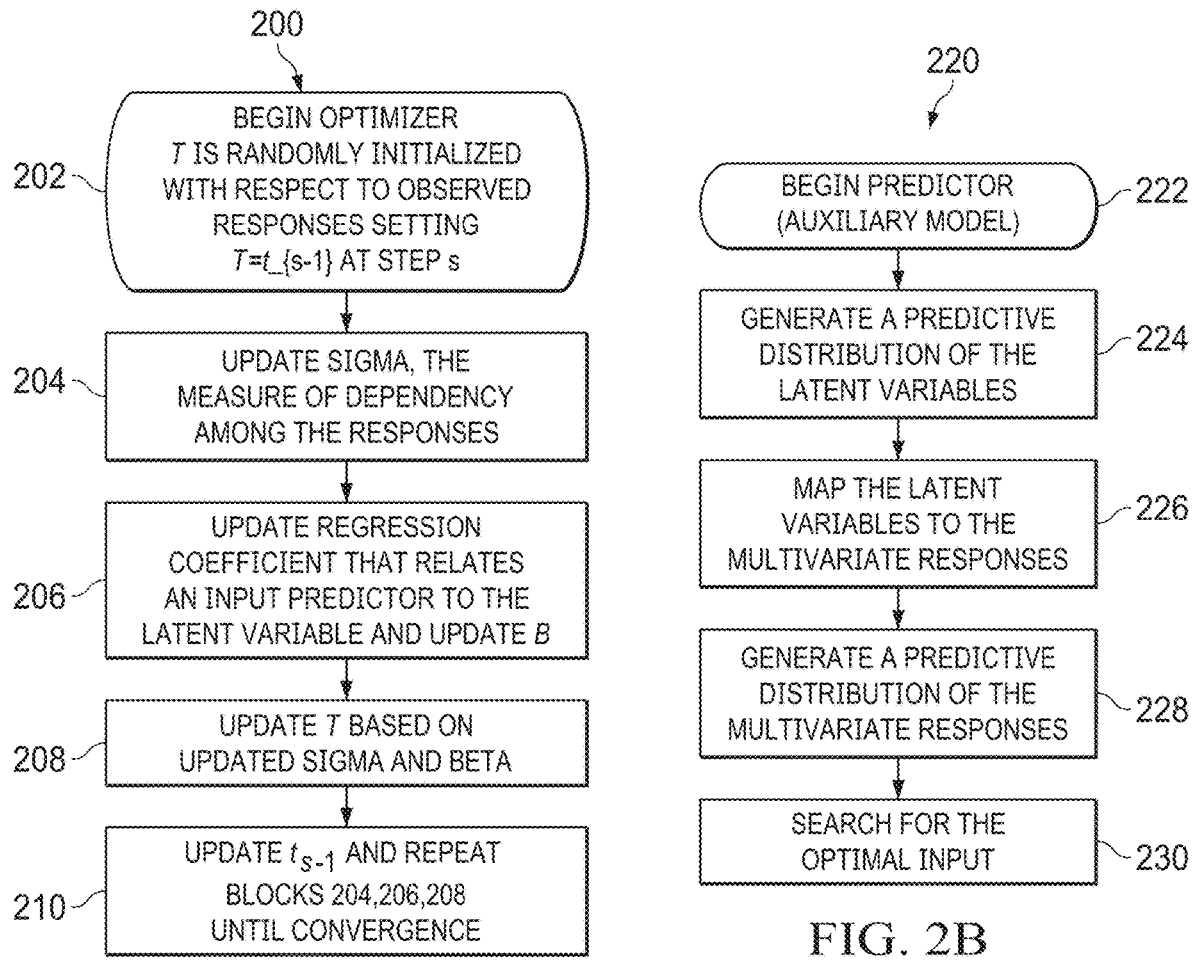
FIG. 2A is an illustration of a is a flow diagram of an algorithm for an optimizer of predictive engine, in accordance with certain example embodiments.
FIG. 2B is a flow diagram of an algorithm for a predictor of the predictive engine, in accordance with certain example embodiments.
FIG. 3A illustrates a table that includes posterior means of the model coefficients (with Geweke Statistics) for a first scenario, in accordance with certain example embodiments.

Referring now to FIG. 2A, illustrated is a flow diagram of an algorithm for the optimizer 102 of predictive engine 100, according to certain example embodiments, denoted generally as 200. In this particular embodiment, Gibbs distribution steps are used to obtain samples so that MCMC estimates of the posterior predictive probabilities can be obtained. The algorithm 200 begins at block 202 where a vector from an auxiliary model is initialized.

$$\text{Initialize } T \text{ w.r.t } Y \ T=t_{s-1} \text{ at step } s. \tag{1}$$

The T is a matrix to be populated with latent variables and the Y corresponds to the vector of observed responses. The $t_{s-1}$ is the initialized latent variable and is a vector associated with the observed response vector Y. Next at block 204, the dependency between the multivariate responses are updated according to equation 2.

$$\text{Update } \Sigma = \Sigma_s \text{ use the fact that } \Sigma|t_{s-1} \sim \text{InverseWishart}$$
$$(n-q,\underline{\Sigma}), \text{ where, } \underline{\Sigma} = t'_{s-1}(I-Z(\underline{x}))(Z(\underline{x})^{-1}Z(\underline{x})')t_{s-1}. \tag{2}$$

The $\Sigma$ represents the covariance matrix, $\hat{\Sigma}$ represents the least squares estimate of $\Sigma$, $Z(\underline{x})$ is a matrix valued function of an input $\underline{x}$, $Z(\underline{x})'$ is its transpose, and $t_{s-1}$ and $t'_{s-1}$ are the scalar and scalar transpose of the auxiliary model. Next, block 206, regression coefficients which relate the predictors to the latent variables and thus the responses are updated, using Eq. 3, and the matrix $\hat{B}$ is updated.

$$\text{Update } B=B_s \text{ use the fact that } B|\Sigma_s, t_{s-1} \sim N_{q \times p}(\tilde{B}, \Sigma, \otimes$$
$$(Z(\underline{x})'Z(\underline{x})^{-1})$$

$$\text{where, } B=(Z(\underline{x})'Z(\underline{x})^{-1}Z(\underline{x})'y) \tag{3}$$

The B represents the matrix of regression coefficients, and the $\hat{B}$ represents the least squares estimate of B, and y represents a scalar of the response vector. Next, block 208, the dependency measure and estimated coefficient are correlated with the latent variable $t_{s-1}$ using Eq. 4, a joint posterior density function, and the auxiliary model is updated accordingly.

$$\text{Update } T=T_s \text{ use the fact that } \pi(\underline{t}|\underline{y},\underline{x},B,\Sigma) \propto \pi(\underline{y}|t) \times \pi$$
$$(\underline{t}|\underline{x},B,\Sigma) = \Pi_{i=1}^P \pi_i^{y_i}(1-\pi_i)^{1-y_i} \times N(B_z(\underline{x}),\Sigma) \tag{4}$$

Next, block 210, the latent variable $t_{s-1}$ is updated and blocks 204-208 are repeated until convergence, i.e. until a solution is stable. So after this step, all the necessary pieces are in place to begin to search the input space to find the optimal input which yields the maximum probability for the desired output.

Referring now to FIG. 2B, illustrated is a flow diagram of an algorithm for the predictor 104 of predictive engine 100, according to certain example embodiments, denoted generally as 220. The algorithm 220 can generate a probability distribution of latent variable, i.e. an auxiliary model, categorize the distribution of latent variables, if necessary, and search an input space to find the optimal input that yields the largest probability of the desired/optimal response, i.e. P(y∈A|x). The algorithm 220 begins at 222 where the auxiliary model is received for processing. Next, block 224, a predictive distribution of the latent variables is determined using Eq. 5, a posterior prediction distribution function.

$$t(t^* \mid \underline{x}, t) = c\left\{1 + \frac{1}{v}\left(t^* - \hat{B}z(x)\right)' H\left(t^* - \hat{B}z(x)\right)\right\}^{-\frac{p+v}{2}} \text{ where,} \tag{5}$$

-continued $$c = \frac{\Gamma\left(\frac{p+v}{2}\right)\sqrt{|H|}}{\Gamma\left(\frac{v}{2}\right)(\pi v)^{p/2}},$$

$$H = \frac{vV^{-1}}{1+z(x)\prime D^{-1}z(x)},$$

$$D = \sum_{i=1}^{n} z(x_i)z(x_i)',$$

$$V = \left(T - \left(\hat{B}Z\right)'\right)'\left(T - \hat{B}Z\right)'\right)$$

Here n is the number of observations, $Z=(z(x_1), z(x_2), z(x_n))$. $\hat{B}$ is the least squares estimate of B given in equation (4) and $T=(t_1, t_2, \ldots, t_p)'$. Next, block 226, the predictive probabilities for the auxiliary model, i.e. the samples of the vector of latent variables, are then converted to the responses, e.g. the categorical responses, using Eq. 6. Since the target is not to find the optimized $\underline{t}$, but to re-map it to the binary response space as $\underline{y}$, the predicted $y_i$ from the conditional distribution of $y_i|t_i$ is obtained as shown in Eq. 6.

$$y_i|t_i = I(t_i > 0)y_i + I(t_i \leq 0)(1-y_i) \forall i \qquad (6)$$

Next, block 228, the predictive probabilities for the categorical outputs are determined. That is to say, $P(y \in A|x)$ can then be approximated by sampling enough times. Next, block 230, a generic numerical optimization algorithm, e.g. some variant of Newton's method, grid search, etc., can be implemented to search for the optimal input.

Response Surface Methodology is a popular set of statistical techniques used to improve a system process. Bayesian multivariate response optimization methods have been proposed that consider the dependence structure among the responses when locating the optimal region as defined by some loss or desirability function. A contribution of this application lies in addressing the Bayesian reliability optimization for multivariate binary responses where the logistic models with traditional Bayesian reliability approach suffers from computational complexities. The application focuses on reducing the computational complexities by introducing latent variables in the response structure. Numerous Response Surface and Design of Experiment (DOE) methodologies including both frequentist and Bayesian approaches have been proposed to address the problem of optimizing multiple responses. Frequentist approaches include Derringer, G. (1980). "Simultaneous optimization of several response variables". *Journal of quality technology,* 12 214-219, and Del Castillo, Montgomery, and McCarville (1996) "Modified desirability functions for multiple response optimization," Journal of quality technology, 28 337-345, which are all based on the optimization of a desirability function with respect to the experimental factor levels. Pignatiello Jr, J. J. (1993) "Strategies for robust multiresponse quality engineering," *IIE transactions,* 25 5-15, and Vining, G., Myers, R. (1990) "Combining Taguchi and response surface philosophies—A dual response approach," Journal of quality technology, 22 38-45 proposed procedures based on minimization of a quadratic loss function. Bayesian approaches have been proposed which analyzes the proportion of nonconforming units but it does not address optimization over response surfaces. Peterson (2004) introduced a Bayesian posterior predictive approach which optimizes a user specified target region on the response space based on the posterior predictive probability with respect to the input space. Peterson's method also addressed specific weaknesses of the frequentist approach by taking into account the covariance structure of the responses and the parameter uncertainty of the models. Wang, J., Ma, Y., Ouyang, L., Tu, Y. (2016) "A new Bayesian approach to multi-response surface optimization integrating loss function with posterior probability," *European Journal of Operational Research,* 249 231-237 incorporated the measures of bias or robustness by combining the idea of quality loss function (Ko, Y. H., Kim, K. J., Jun. C. H. (2009), "A new loss function-based method for multiresponse optimization," Journal of Quality Technology, 37 50-59) with Peterson's Bayesian reliability approach and showed that the proposed method provides a more reasonable solution.

Although, Peterson's approach has considered optimizing multivariate quantitative responses only, the same idea can be extended to qualitative responses as well. For example, an output of interest can be defined in terms of whether or not multiple outputs meets certain quality characteristics or tests, whether the output product is free of multiple possible defects, and so on. Currently, no widely accepted methods exist for how to optimize response surfaces derived from experimental designs to address such questions. Moreover, the proposed method—which is based on Bayesian statistical theory—can be extended to a broader audience as it can solve many other experimental design problems like drug tests in the pharmaceutical industries or checking the effects of different chemical components (e.g. ignition tests) in the chemical industries or even in manufacturing domain. For a specific research interest, the serum testing experiment on infected mice (Smith, W. (1932), "The titration of antipneumococcus serum," Journal of Pathology, 35 509-526) can be considered, where different doses of serum were injected to mice and the response was their survival after seven days. Different other qualitative characteristics of those mice can be obtained as responses to retrieve the effects of different dosage of serum.

Recent advancements is different computation techniques and efficiency gained through higher computing power opened many opportunities to handle complex modeling scenarios where the data need to be handled in an indirect way. In many situations, unsupervised learning methods need to be implemented to gain better insight from the dataset. For example, let us consider a situation of a psychometric test where some patients have been given with different dosages of multiple medicines and after completing a full course of treatment, the patients are provided with a questionnaire with some sample questions as whether the patients have any pain (yes or now), whether the patients have developed any rashes (yes or no) or how the patients are feeling compared to the time before the treatment started (on a scale of 1 to 10) and so on. One another example could be a market survey for a cookie to optimize its quality based some responses like chewiness, hardness, sweetness etc. These are couple of typical scenarios where the responses are qualitative but correlated. A typical arcsine transformation would treat the responses independently and also will tend to skew if number of categories grows moderately large. Hence, it is important to handle the responses in a data driven way such that the dependence structure among themselves can be preserved.

In the disclosure, the implementation of Peterson's (2004) posterior predictive approach is extended to binary responses and to categorical responses with more than two levels. The approach is illustrated with a case study.

Implementation of the Bayesian posterior predictive approach to the binary logistic case induces a complicated posterior formulation. As a simple example, consider a univariate binary logistic model as, $$\text{logit } P(y=1|\underline{\beta},\sigma)=\underline{\beta}'z(\underline{x})+e.$$

Where e has a multivariate normal distribution with mean vector $\underline{0}$ and covariance matrix $\sigma^2/n$. Consider a similar setup as Peterson (2004) with a Bayesian modeling of the above logit link and a non-informative prior on $\underline{\beta}$ and $\sigma^2$ as $$\pi(\underline{\beta},\sigma^2) \propto \frac{1}{\sigma}.$$

The joint density of $(\underline{y}, \underline{\beta}, \sigma^2)$ is given by, $$\pi(\underline{y},\underline{\beta},\sigma^2|\underline{x}) \propto \frac{e^{\beta'z(x)}}{1+e^{\beta'z(x)}} \times \frac{1}{\sigma}$$

Hence a closed form expression of the posteriors as well as the posterior predictive density is difficult to obtain even in the univariate case.

A nice approximation in the multivariate logistic regression case comes from the multi-variate t distribution, $$P(y_1 = y_{10}, y_2 = y_{20}, \ldots, y_p = y_{p0} | B, \Sigma, \underline{x}) =$$

$$\tau_{p,v}(\underline{y}|\underline{\mu}=\underline{0},\Sigma) \times \prod_{i=1}^{p} \frac{l(y_i|\beta_i)}{\tau_{v,1}(y_i|\mu_i=0,\sigma_1^2=1)} \text{ where,}$$

$$\tau_{p,v}(\underline{y}|\underline{\mu},\Sigma) = \left(\frac{\Gamma((v+p)/2)}{\Gamma(v/2)(v\pi)^{p/2}|\Sigma|^{1/2}}\right) \times$$

$$\left\{1 + \frac{1}{v}(\underline{y}-\underline{\mu})'\Sigma_{-1}(\underline{y}-\underline{\mu})\right\}^{-(v+p)/2} \text{ and,}$$

$$l(y|\beta_i) = \frac{e^{x'\beta_i}}{1+e^{x'\beta_i}}$$

Here $\underline{\beta}_i$ is the $i^{th}$ row of B. If a similar prior set up as Peterson (2004), i.e.

$$\pi(B,\Sigma) \propto |\Sigma|^{-\frac{p+1}{2}},$$

is considered then the joint posterior can be written as, $$P(B,\Sigma|\underline{y},\underline{x}) \propto \tau_{p,v}(\underline{y}|\underline{\mu}=\underline{0},\Sigma) \times \prod_{i=1}^{p} \frac{l(y_i|\beta_i)}{\tau_{v,1}(y_i|\mu_i=0,\sigma_1^2=1)} \times |\Sigma|^{-\frac{p+1}{2}}$$

The marginal posteriors do not to have closed form expressions and require the Metropolis-Hastings to approximate. The Bayesian method proposed in the application approaches the problem from a Bayesian classification modeling perspective. The latent response variables are iteratively mapped to the original observed binary responses in such a way that an optimal representation of the binary variables in terms of a separated non-overlapping hyperplane is obtained.

In the following section, a binary response optimization model along with the corresponding prior structure is presented. Gibbs steps are used to obtain samples so that MCMC estimates of the posterior predictive probabilities can be obtained. Simulation studies are also presented that have been carried out for multiple scenarios to check the performance of the model and some convergence diagnostics for the MCMC have been provided. Additionally, the model is implemented to a real data through different numerical optimizations over the posterior predictive density domain. Finally, as a conclusion key findings along with the scope of the method's applicability is presented.

A Bayesian reliability model for multivariate binary responses is presented. Suppose $Y=(y_1, y_2, \ldots y_p)'$ is the multivariate (p×1) response vector and $x=(x_1, x_2, \ldots, x_k)'$ is the (k×1) vector of predictors. Here, the responses $y_i \forall i \in 1, 2, \ldots, p$ are binary taking values 0 or 1. The goal of the analysis is to maximize the probability that $\underline{y}$ is inside a user specified target region A with respect to the input space $\underline{x}$, i.e. to maximize $P(\underline{y} \in A|\underline{x})$. Define a latent variable $t_{ij}$ of the form $y_{ij}=I(t_{ij}>0)$. Hence $y_{ij}$'s are identified though the latent variables $t_{ij}$'s. To get an interpretation of such a representation, t can be assumed to be an element from an induced p dimensional hyperplane from the input space. An optimal classification model obtained through t will divide the hyperplane into two disjoint sections where $\underline{y}$ can be classified optimally.

The Bayesian classical response surface technique is adapted to model $\underline{t}$ and the density of the distribution of t towards each side of the real line with respect to zero defines the outcome for $\underline{y}$. It is assumed that $y_i$'s are conditionally independent given $t_i$'s, that is, $$P(Y_i=y_i|t_i)=\theta_i^{y_i}(1-\theta_i)^{1-y_i} \forall i=1,2,\ldots,p \quad (1)$$

where, $\theta_i = P(t_i > 0)$.

The conditional independence simply translates the propagation of the orthogonality among the dimensions of the hyperplane to the dimensions of the multivariate responses. Hence, the conditional independence of the $Y_i$'s preserves the marginal dependence as well as makes the model easier to handle and interpret. Since, t is defined over the real space and represents the binary responses in a well-defined way, t can be used to write our regular regression model as, $$\underline{t}=Bz(\underline{x})+\underline{e}. \quad (2)$$

where B is a p×q matrix of regression coefficients and $z(\underline{x})$ is a q×1 vector valued function of $\underline{x}$. A typical example of $z(\underline{x})$ can consist of the first and the second order effects as well as the interactions, i.e. if $x_1$ and $x_2$ are two model inputs, then $z(\underline{x})=(x_1,x_2,x_1^2,x_2^2,x_1x_2)$. It can be assumed $z(\underline{x})$ is the same for all response variables and e has a multivariate normal distribution with mean vector $\underline{0}$ and covariance matrix E. A non-informative joint prior on $(B, \Sigma)$ can be taken as, $$\pi(B,\Sigma) \propto |\Sigma|^{-\frac{p+1}{2}} \quad (3)$$

Although the underlying model considers a multivariate binary response model, considering a nested auxiliary model through latent variables simplifies the extraction of the dependence structure between the responses. The covariance matrix $\Sigma$ defines the dependence between the $t_i$'s which translates to the dependence structure between the binary responses $y_i$'s.

The joint posterior density of $\underline{t}$, B, $\Sigma|\underline{y}, \underline{x}$ can be written as:

$$\pi(\underline{t}, B, \Sigma | \underline{y}, \underline{x}) \propto \pi(\underline{y} | \underline{t}) \times \pi(\underline{t} | \underline{x}, B, \Sigma) \times \pi(B, \Sigma) \propto$$

$$\prod_{i=1}^{p} \pi_i^{y_i}(1 - \pi_i)^{1-y_i} \times N(Bz(\underline{x}), \Sigma) \times |\Sigma|^{-\frac{p+1}{2}}$$

The posterior expression shows the underlying model is a simple Bayesian regression model nested within a binary structure. As the expressions containing y, the binary predictor is free from the model parameters, the closed form posterior expressions for B and $\Sigma$ can be easily obtained from the simple techniques of Bayesian linear regression.

Since binary and categorical response modeling have been considered in the application, the target for an experimenter could be of the form $p(\underline{x})=P(\underline{y}=A|\underline{x})$ where A is a vector of 0's and 1's. Hence, the task is to obtain the posterior predictive distribution of t and get the posterior predictive distribution of $\underline{y}$ conditioned on $\underline{t}$, but since the actual t is not being observed, but rather $\underline{y}$, the optimized t needs to be obtained which can be considered representatives of the distribution of $\underline{y}$. To this end, an arbitrary $\underline{t}$ is selected and then the model is updated with the posterior density of B and $\Sigma$ and then finally update $\underline{t}$ by incorporating the observed $\underline{y}$ in the updated model. The details of the Gibbs steps for optimizing $\underline{t}$ are given below.

Gibbs Steps:

(i) Initialize T w.r.t Y

Start with T=$t_{s-1}$ at step s.

(ii) Update $\Sigma=\Sigma_s$ $$\Sigma|t_{s-1} \sim \text{InverseWishart}(n-q, \hat{\Sigma}),$$

where, $\hat{\Sigma}=t'_{s-1}(I-Z(\underline{x})Z(\underline{x})'Z(\underline{x})^{-1}Z(\underline{x})')t_{s-1}$.

(iii) Update B=$B_s$

Use the fact that:

$$B|\Sigma_s, t_{s-1} \sim N_{q \times p}(\hat{B}, \Sigma \otimes (Z(\underline{x})Z(\underline{x}))^{-1}Z(\underline{x})')t_{s-1}.$$

where, $B=(Z(\underline{x})'Z(\underline{x}))^{-1}Z(\underline{x})'\underline{y}$ (4)

(iv) Update T=$t_s$ and go to step (2)

Use the fact that:

$$\pi(\underline{t} | \underline{y}, \underline{x}, B, \Sigma) \propto \pi(\underline{y} | \underline{t}) \times \pi(\underline{t} | \underline{x}, B, \Sigma) = \prod_{i=1}^{p} \pi_i^{y_i}(1-\pi_i)^{1-y_i} \times N(B_z(\underline{x}), \Sigma)$$

The above steps are repeated until convergence. Then T=$t^*$ can finally be predicted based on the optimized input t using the multivariate t posterior predictive distribution:

$$t(t^* | \underline{x}, t) = c\left\{1 + \frac{1}{v}(t^* - \hat{B}z(x))'H(t^* - \hat{B}z(x))\right\}^{-\frac{p+v}{2}} \text{ where,} \quad (5)$$

$$c = \frac{\Gamma\left(\frac{p+v}{2}\right)\sqrt{|H|}}{\Gamma\left(\frac{v}{2}\right)(\pi v)^{p/2}},$$

$$H = \frac{vV^{-1}}{1 + z(x)'D^{-1}z(x)},$$

$$D = \sum_{i=1}^{n} z(\underline{x}_i)z(\underline{x}_i)',$$

$$V = (T - (\hat{B}Z)')'(T - \hat{B}Z')$$

Here n is the number of observations, Z=(z($x_1$), z($x_2$), z($x_n$)). $\hat{B}$ is the least squares estimate of B given in equation (4) and T=($\underline{t}_1, \underline{t}_2, \ldots, \underline{t}_p$)'. Since the target is not to find the optimized $\underline{t}$, but to re-map it to the binary response space as $\underline{y}$, predicted $\underline{y}_i$ is obtained from the conditional distribution of $y_i | t_i$ as, $$y_i | t_i = I(t_i > 0)y_i + I(t_i \leq 0)(1-y_i) \forall i \quad (6)$$

Here n is the number of observations, Z=(z($x_1$), z($x_2$), ..., z($x_n$)), $\hat{B}$ is the least squares estimate of B given in equation (4) and T=($\underline{t}_1, \underline{t}_2, \ldots, \underline{t}_p$)'.

The final goal is to find the optimum region in the input space, where the probability that $\underline{y}$=A for some user defined ordered set A of 0's and 1's can be optimized, the posterior predictive distribution of $\underline{y}$ can be sampled in order to obtain an approximation of P($\underline{y}$=A|$\underline{x}$). Hence, the estimates of the probabilities of such kind for each given x in the input space can be obtained. Now, the target is to know which x or some neighborhood that optimizes such a probability so that it can be said to be the most reliable working region for producing the optimized output with respect to the user defined conditions. There are several ways of solving such an optimization problem over the input space $\underline{x}$. The most naive way to is to form a grid over the input space and compute P($\underline{y}$=A|$\underline{x}$) for each grid point $\underline{x}$. This is the easiest way to obtain the desired x but the efficiency of this process depends on the number of splits to obtain the grid points. Also, too many grid point may slow down the whole computation. Another possible way is to pick points randomly from the input space $\underline{x}$ and obtain the probability P($\underline{y}$=A|$\underline{x}$). This process also suffers from the same issue as grid search method since significantly many points have to be obtained from the input space so that the optimized input region is not missed.

Another process mathematically more sophisticated is to obtain the optimized point through ridge analysis where the input space is optimized first over the circumference of a hypersphere of radius r and suppose $\underline{x}_r$ is the optimized point. Then the process is continued with different values of r and finally the optimized $\underline{x}_0$ over the set $\{\underline{x}_r : r=r_1, r_2, \ldots, r_k\}$ is found.

In order to check the performance of modeling multivariate binary responses through latent continuous variables, simulation studies on 2 different scenarios are performed.

In the first scenario, a $2^3$ design with main effects only and 2 response variables are considered. The model is simulated using some randomly generated values for B=((0.213797, 0.222853, −0.4923, −0.22765), (−0.07103, −0.38147, −0.200283, −0.41591)) and a randomly generated covariance matrix $\Sigma$. FIG. 3A illustrates a table (referenced herein as Table 1) that includes posterior means of the model coefficients (with Geweke Statistics) for scenario 1. FIG. 3B are autocorrelation plots for the MCMC samples of the model coefficients in scenario 1. Executing the Gibbs steps 10,000 times with a burn-in period of 8,000. Table 1 shows the posterior means for the model coefficients along with the Geweke summary Z-statistics for the convergence diagnostics. Moreover, FIG. 3B-1 and FIG. 3B-2 show the autocorrelation plot for the MCMC samples generated from the posterior distributions of the model coefficients.

Figure 4B:
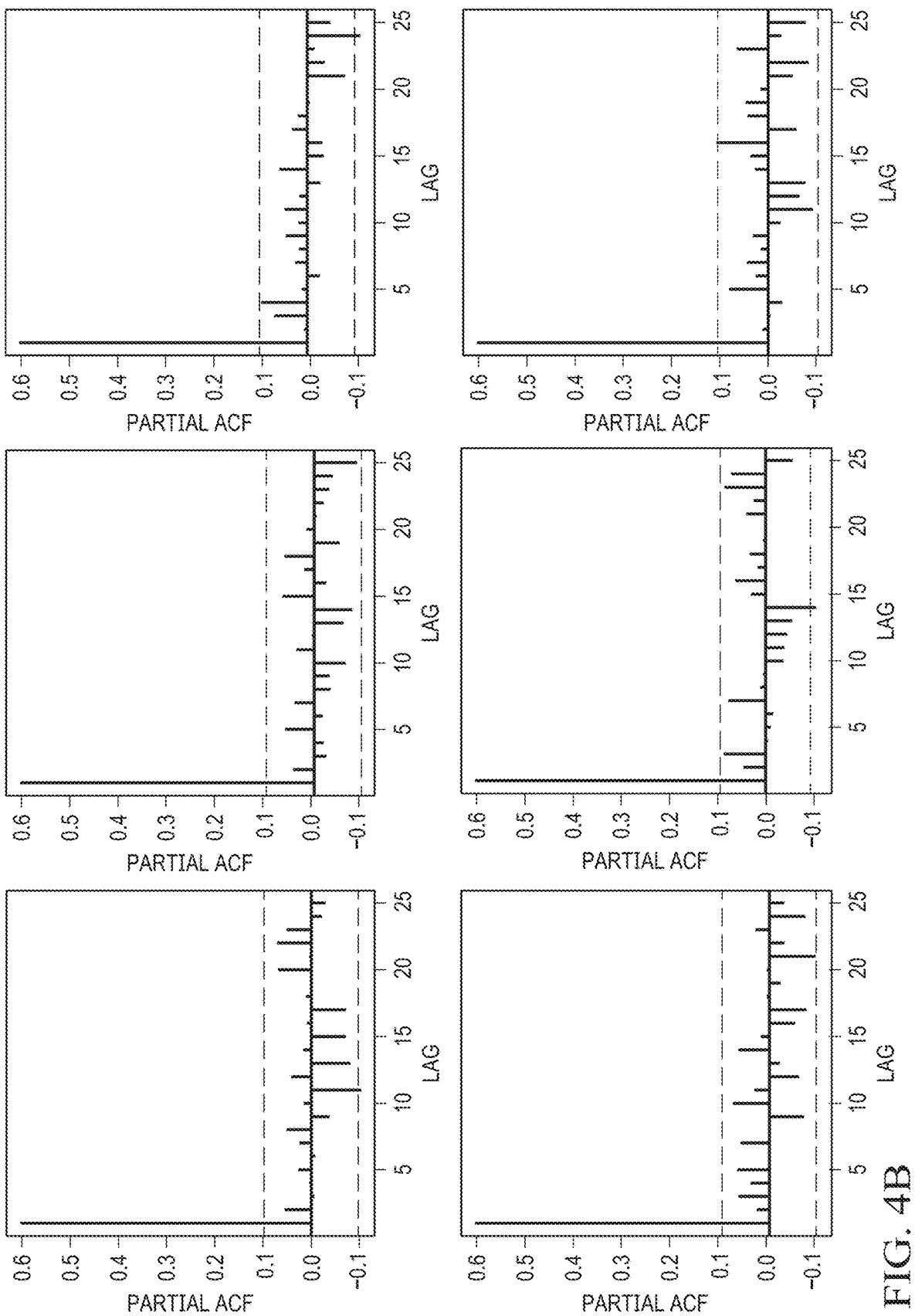
FIG. 4B illustrates partial autocorrelation plots for MCMC samples of the intercept and the main effects for an output, $y_1$, in accordance with certain example embodiments.

In the second scenario, a $2^5$ design including all second order interactions in the model and 3 response variables is considered. The model is simulated using some randomly generated values of B and $\Sigma$. The true values for the model coefficients in B is illustrated FIG. 4A (referenced herein as Table 2). The Gibbs is executed sampling 25,000 times with a burn-in period of 15,000. The posterior mean for the model coefficient along with the Geweke summary Z-scores for convergence diagnostics is illustrated in FIG. 4C (referenced herein as Table 3). Illustrated in FIG. 4B are partial autocorrelation plots for the MCMC samples of the intercept and the main effects for $y_1$.

It is evident from both of the simulation studies in the two scenarios that the proposed algorithm is quite efficiently estimating the true underlying model. The technique that has been implemented to generate the true model is to first generate true latent responses from the randomly generated model parameters and then generate the binary responses though the conditional density given the auxiliary latent responses. In that sense, the proposed model is only able to see the data through the binary responses and has no knowledge of the underlying latent responses. Instead of that, the highest posterior density intervals and the posterior means for the model coefficients indicates that the model is well able to get close to the true scenario.

Also, the MCMC diagnostics through Geweke Z-scores and autocorrelation and partial autocorrelation plots indicates the MCMC has attained good mixing and proper convergence to the stationary distribution. Although, thinning has been applied to decrease the autocorrelation between the successive samples.

In this section, a case study which involves cigarette ignition testing on soft furnishing is considered. The goal of the study is to determine whether potency of cigarette as an ignition source could be moderated by modifying different cigarette characteristics. In reference to Krasny, J., Gann, R. Eberhardt, K (1986). NIST Dataplot datasets—http://www.itl.nist.gov/div898/software/dataplot/datasets.htm—the data is considered which consists of 8 responses and 5 predictors. The key aspect of this study is to check the resistance of the fabric to cigarette ignition. Among those 8 responses, 4 are categorical stating the number of ignitions out of 5 trials over different types of fabrics. The 5 predictors represent the different characteristic of cigarettes.

Since the motivation is to find a reliable operating region for multiple binary responses, working only with the 4 categorical responses namely "California Test Fabric/Cotton Batting", "100% Cotton Splendor Fabric/Polyur, 2045", "100% Cotton Denim Fabric/Polyur, 2045" and "100% Cotton Splendor Fabric/Polyur, 2045" is considered. The categorical response problem to a binary response is converted in the following way. The converted response variables take the value 0 if their observed value is less than or equal to 2 and 1 otherwise. As the goal for this experiment is to locate a region within the input space that minimizes the number of ignitions, the response vector of interest is (0, 0, 0, 0). The 5 predictors are respectively "Citrate Concentration (0.8 and 0)", "Paper Porocity (Low and High)", "Expanded (No Fluff and Fluff)", "Tobacco Type (Burley and Flu-Cured)", "Circumference in MM". The two levels for each predictor have been denoted as −1 (low) and +1 (high) respectively in the data. All main effects of the 5 independent variables along with all first order interactions are considered. A restriction of up to a second order polynomial is implemented to reduce the number of model parameters. Also, the squared main effects are not included as it is preferred to bypass any multicollinearity due to correlated predictors.

The initial Gibbs steps are ran for estimating the model parameters 25,000 times with 15,000 burn-ins. FIG. 5C (referenced herein as Table 4) shows the posterior estimates of the model coefficients. Table 4 illustrates the posterior means of Model Coefficients (with Posterior Standard Deviations).

To maintain consistency with the original dataset, $x_1$, $x_2$, $x_3$, $x_4$, $x_5$ are defined to represent $V_9$, $V_{10}$, $V_{11}$, $V_{12}$, $V_{13}$, respectively. The first 8 variables correspond to the responses. Only the 4 categorical responses $V_5$, $V_6$, $V_7$, $V_8$ are worked on and are represented as $y_1$, $y_2$, $y_3$, $y_4$ respectively. Next, the MCMC iterations are ran on the posterior predictive density 1,000 times for each point in the input space to estimate the probability $P(y_1=0, y_2=0, y_3=0, y_4=0|\underline{x})$. The MCMC estimates of the probabilities are ran over a grid on the covariate space and then optimize over the grid. Thinning has been applied to the posterior to reduce autocorrelation between successive samples.

Figure 5A:
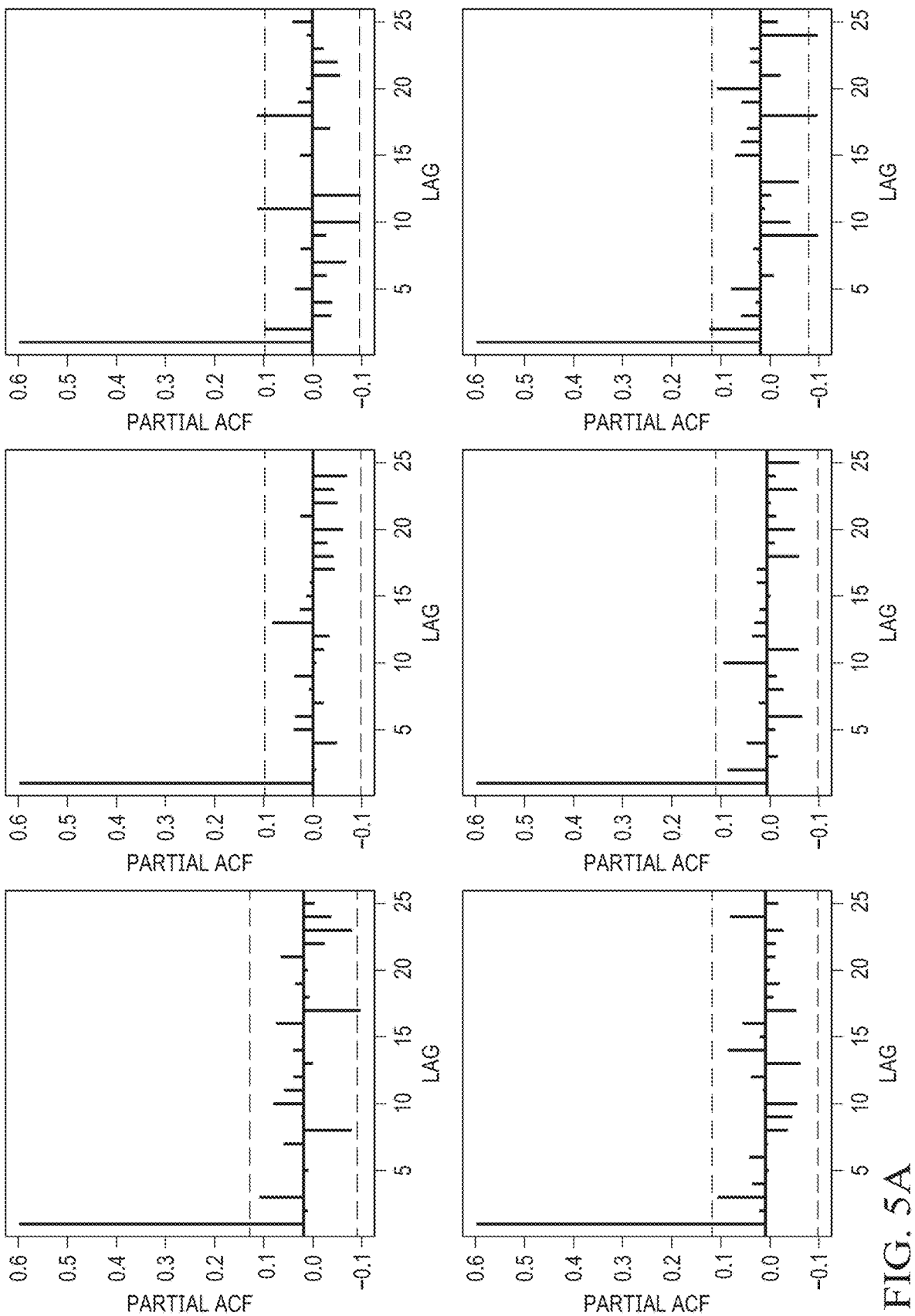
FIG. 5A illustrates partial autocorrelation plots for MCMC samples of the intercept and the main effects corresponding to output, $y_1$, in accordance with certain example embodiments.

The decreasing pattern for higher lag in the partial autocorrelation plots for the intercepts and the main effects for response $y_1$ in FIG. 5A indicates a good mixing of the MCMC chain. FIG. 5A are partial autocorrelation plots for the MCMC samples of the intercept and the main effects corresponding to $y_1$.

Based on the grid search method, the optimized points over the input space are given by, $x_1=0.926$, $x_2=-0.971$, $x_3=0.944$, $x_4=-0.782$, and $x_5=-0.579$. Moreover, the optimized probability is given by $P(y_1=0, y_2=0, y_3=0, y_4=0|\underline{x})=0.703$. Hence, it can be concluded if the covariates can be set to the optimized values, there is a 70.3% chance that the proportion of ignition on the 4 given fabrics can be lowered by 40% or less (2 or less out of 5 trials).

Figures 1, 5B:
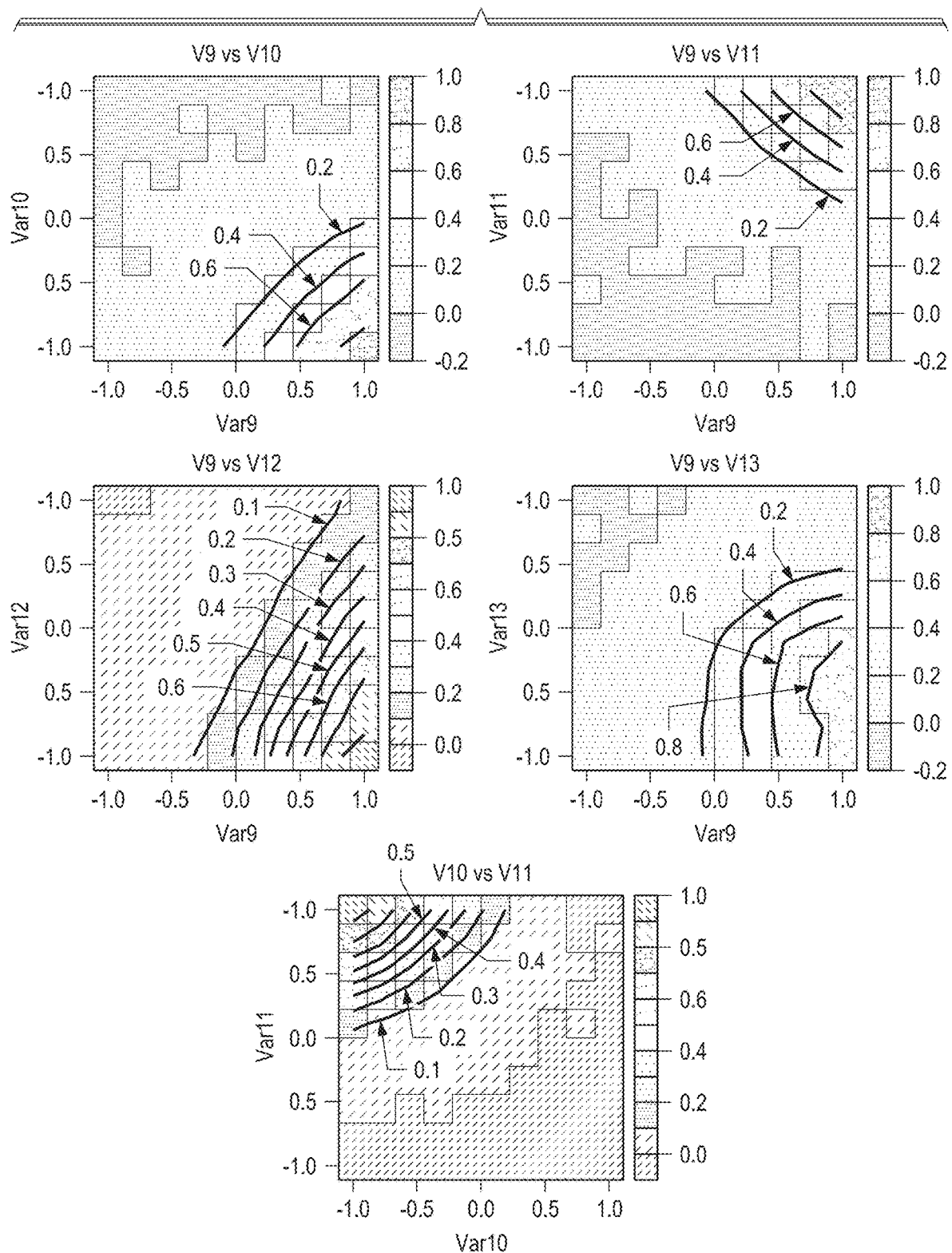
Figures 2, 5B:
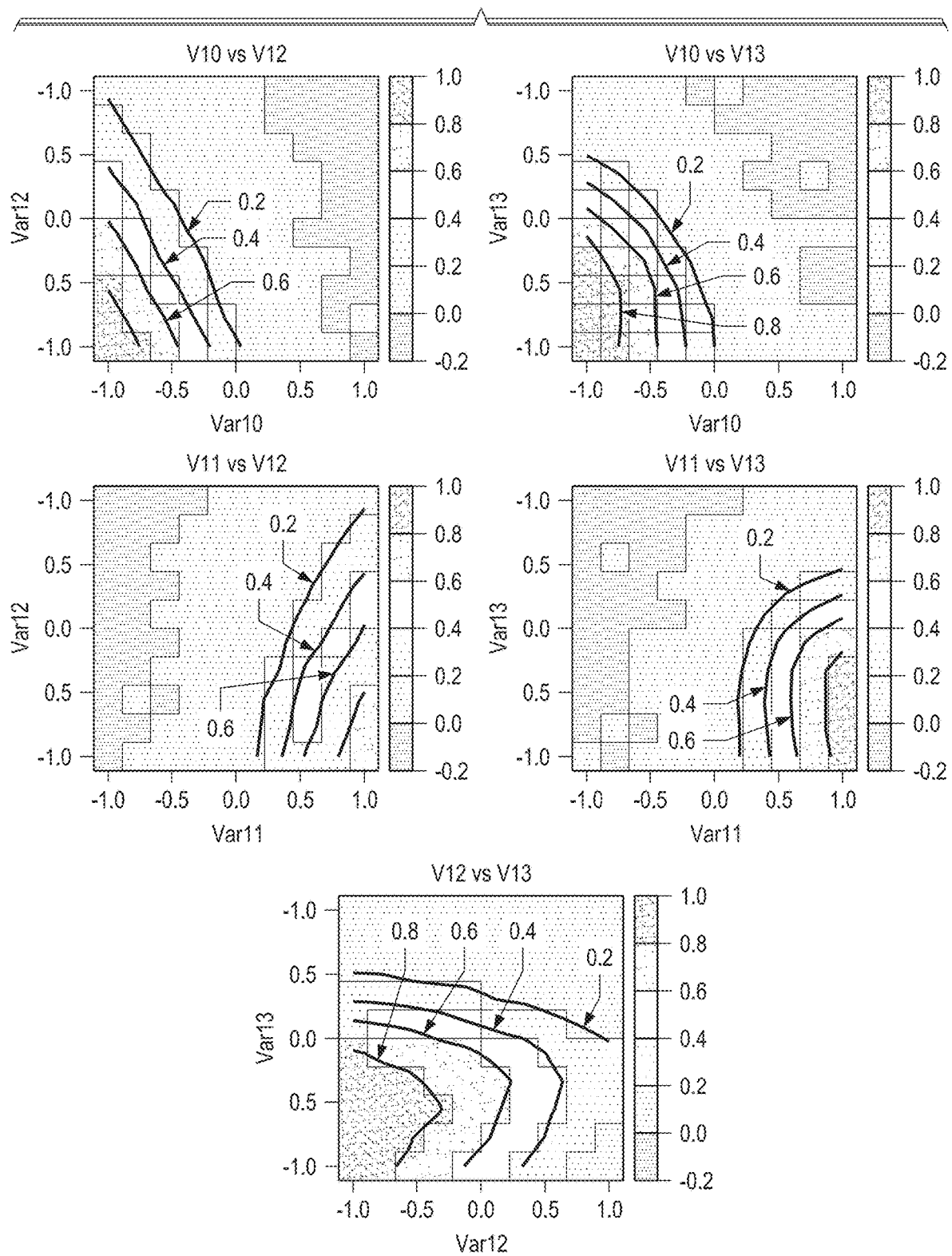
Figures 5C, 6:
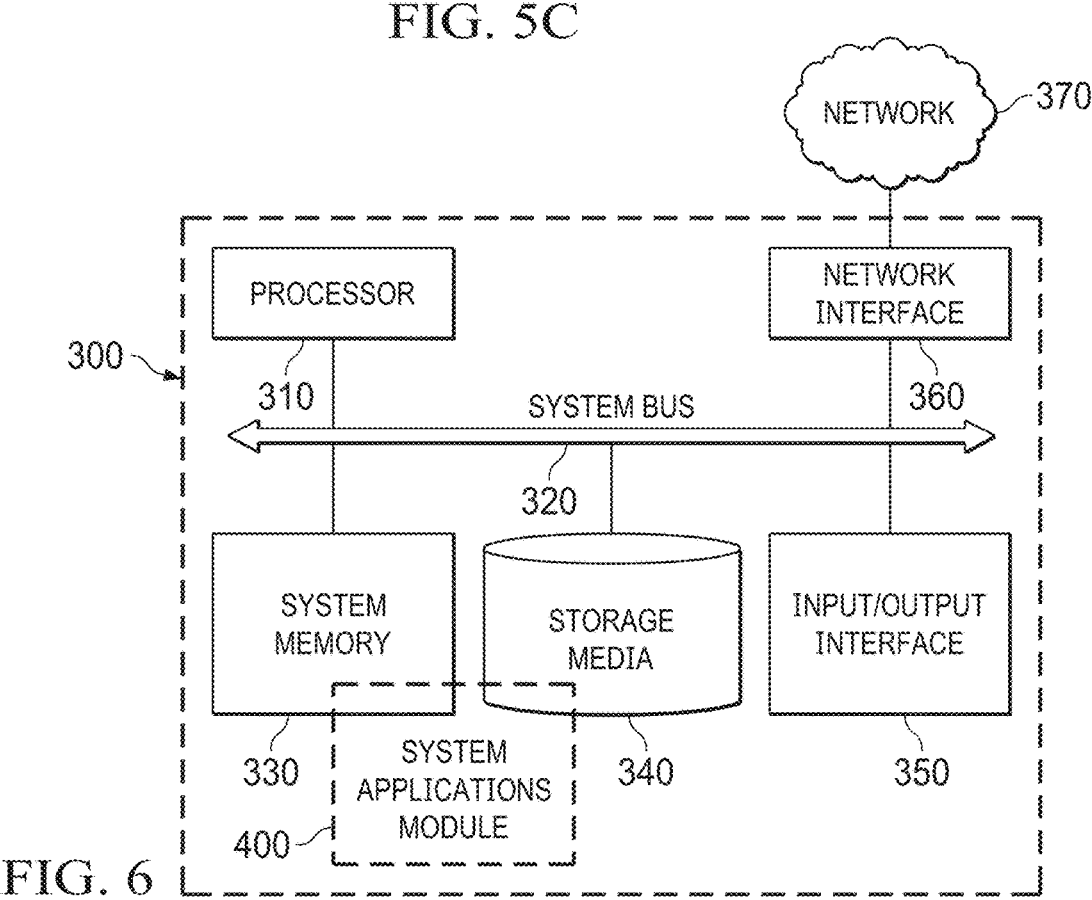
FIG. 5C illustrates a table of posterior estimates of the model coefficients, in accordance with certain example embodiments.
FIG. 6 is a block diagram depicting a computing machine and system applications, in accordance to certain example embodiments.

It is quite important to run the Gibbs sampling until proper convergence in order to ensure an optimal representation of the binary responses in terms of the latent continuous variables. The optimization problem in the input space through ridge analysis or grid search method depends on the number of grid points or radius selected while doing the optimization so that it can represent the input space well enough. To have a decent understanding on the operating region for future target output, very fine segments of the input space has to be made in either case. A logistic model can also be used to model the probability surface though a higher degree polynomial so that it can easily capture the local maxima's or minima's in case the output become multimodal. The issue of flat probability surface over a large neighborhood of the input space, which will lead the estimation of the optimized input space to be unstable, may also be encountered. Although, an optimized operational region is easy obtainable if the experimenter tries to retrieve the region instead of a point that has a probability higher than some pre-defined cut off. In general, the user would like to retrieve the region with highest 5% or 10% probability. A good understanding of the optimized operating region can be easily obtained from the different plots with respect to different pairs of covariates in FIG. 5B-1 and FIG. 5B-2. FIG. 5B-1 and FIG. 5B-2 illustrates probability plots for the target response region over the domain of a covariate pairs when other covariates are set to their optimized values.

Consider $\underline{y}=(y_1, y_2, \ldots, y_p)$ is a multivariate $p \times 1$ response vector where each $y_i$ can be observed in any of it's $q_i$ different levels, $\forall i \in 1, 2, \ldots, p$. In this scenario, the technique of binary response optimization, if the levels are ordered in some format, can be easily extended. For example, suppose the task is to predict the grades of the students in some course based on the hours the students studied in the preceding week of exam and the hours the students slept. Now, the response variable in this model is grades which can be ordered in a low to high format.

Suppose the different levels of $y_i$'s are encoded in an ordered format as $\{1, 2, \ldots, q_i\}$ that is, with first $q_i$ natural numbers. Consider a latent variable $t_i$ where, $$t_i \in \begin{cases} (-\infty, c_1) & \text{if } y_i = 1 \\ [c_{yi-1}, c_{yi}) & \text{if } y_i \in \{2, 3, \ldots, q_i-1\} \\ [c_{qi-1}, \infty) & \text{if } y_i = q_i \end{cases}$$

It can be assumed, $y_i$'s are conditionally independent given $t_i$'s and, $$y_i \mid t_i \sim Multinomial(1, p_1, p_2, \ldots, p_{qi-1}) \text{ where,}$$

$$p_1 = P(t_i < c_1)$$

$$p_k = P(c_{yk-1} \leq t_i < c_{yk}) \; \forall \; y_k \in \{2, 3, \ldots, q_i-1\}$$

$$p_{qi} = 1 - \sum_{k=1}^{qi-1} p_k$$

Hence, this is a similar modeling scenario as previously discussed where now there are conditionally independent responses distributed as multinomial random variables instead of Bernoulli. The posteriors densities of the parameters and the posterior predictive density of y can be derived in a very similar fashion as discussed above.

An important aspect of the disclosure is a closed form Bayesian technique for multivariate binary response optimization problems. Looking at the problem from an unsupervised learning perspective of classifying the responses through a fully Bayesian computation not only has made the problem mathematically sound, but also has given tremendous computational advantages. The interpretability of the latent continuous responses from a classification problem perspective allows the technique to be extended beyond a design of experiment problem as it carries over the covariance structure of any categorical responses to a continuous domain.

This method also provides a parameter uncertainty measure instead of a point estimate as in frequentist methods. This gives a great advantage for process control as the experimenter would not only have a proper knowledge about the optimal input settings, but also would know how many times the process can fail even when the inputs are set to their optimal settings. Extension of the whole technique to incorporate multivariate categorical responses simply broadens the above perspective.

Referring now to FIG. 6, illustrated is a computing machine 300 and a system applications module 400, in accordance with example embodiments. The computing machine 300 can correspond to any of the various computers, mobile devices, laptop computers, servers, embedded systems, or computing systems presented herein. The module 400 can comprise one or more hardware or software elements, e.g. other OS application and user and kernel space applications, designed to facilitate the computing machine 300 in performing the various methods and processing functions presented herein. The computing machine 300 can include various internal or attached components such as a processor 310, system bus 320, system memory 330, storage media 340, input/output interface 350, and a network interface 360 for communicating with a network 370, e.g. cellular/GPS, Bluetooth, or WIFI.

The computing machines can be implemented as a conventional computer system, an embedded controller, a laptop, a server, a mobile device, a smartphone, a wearable computer, a customized machine, any other hardware platform, or any combination or multiplicity thereof. The computing machines can be a distributed system configured to function using multiple computing machines interconnected via a data network or bus system.

The processor 310 can be designed to execute code instructions in order to perform the operations and functionality described herein, manage request flow and address mappings, and to perform calculations and generate commands. The processor 310 can be configured to monitor and control the operation of the components in the computing machines. The processor 310 can be a general purpose processor, a processor core, a multiprocessor, a reconfigurable processor, a microcontroller, a digital signal processor ("DSP"), an application specific integrated circuit ("ASIC"), a controller, a state machine, gated logic, discrete hardware components, any other processing unit, or any combination or multiplicity thereof. The processor 310 can be a single processing unit, multiple processing units, a single processing core, multiple processing cores, special purpose processing cores, co-processors, or any combination thereof. According to certain embodiments, the processor 310 along with other components of the computing machine 300 can be a software based or hardware based virtualized computing machine executing within one or more other computing machines.

The system memory 330 can include non-volatile memories such as read-only memory ("ROM"), programmable read-only memory ("PROM"), erasable programmable read-only memory ("EPROM"), flash memory, or any other device capable of storing program instructions or data with or without applied power. The system memory 330 can also include volatile memories such as random access memory ("RAM"), static random access memory ("SRAM"), dynamic random access memory ("DRAM"), and synchronous dynamic random access memory ("SDRAM"). Other types of RAM also can be used to implement the system memory 330. The system memory 330 can be implemented using a single memory module or multiple memory modules. While the system memory 330 is depicted as being part of the computing machine, one skilled in the art will recognize that the system memory 330 can be separate from the computing machine 300 without departing from the scope of the subject technology. It should also be appreciated that the system memory 330 can include, or operate in conjunction with, a non-volatile storage device such as the storage media 340.

The storage media 340 can include a hard disk, a floppy disk, a compact disc read-only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 340 can store one or more operating systems, application programs and program modules, data, or any other information. The storage media 340 can be part of, or connected to, the computing machine. The storage media 340 can also be part of one or more other computing machines that are in communication with the computing machine such as servers, database servers, cloud storage, network attached storage, and so forth.

The applications module 400 and other OS application modules can comprise one or more hardware or software elements configured to facilitate the computing machine with performing the various methods and processing functions presented herein. The applications module 400 and other OS application modules can include one or more algorithms or sequences of instructions stored as software or firmware in association with the system memory 330, the storage media 340 or both. The storage media 340 can therefore represent examples of machine or computer readable media on which instructions or code can be stored for execution by the processor 310. Machine or computer readable media can generally refer to any medium or media used to provide instructions to the processor 310. Such machine or computer readable media associated with the applications module 400 and other OS application modules can comprise a computer software product. It should be appreciated that a computer software product comprising the applications module 400 and other OS application modules can also be associated with one or more processes or methods for delivering the applications module 400 and other OS application modules to the computing machine via a network, any signal-bearing medium, or any other communication or delivery technology. The applications module 400 and other OS application modules can also comprise hardware circuits or information for configuring hardware circuits such as microcode or configuration information for an FPGA or other PLD. In one exemplary embodiment, applications module 400 and other OS application modules can include algorithms capable of performing the functional operations described by the flow charts and computer systems presented herein.

The input/output ("I/O") interface 350 can be configured to couple to one or more external devices, to receive data from the one or more external devices, and to send data to the one or more external devices. Such external devices along with the various internal devices can also be known as peripheral devices. The I/O interface 350 can include both electrical and physical connections for coupling the various peripheral devices to the computing machine or the processor 310. The I/O interface 350 can be configured to communicate data, addresses, and control signals between the peripheral devices, the computing machine, or the processor 310. The I/O interface 350 can be configured to implement any standard interface, such as small computer system interface ("SCSI"), serial-attached SCSI ("SAS"), fiber channel, peripheral component interconnect ("PCP"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 350 can be configured to implement only one interface or bus technology. Alternatively, the I/O interface 350 can be configured to implement multiple interfaces or bus technologies. The I/O interface 350 can be configured as part of, all of, or to operate in conjunction with, the system bus 320. The I/O interface 350 can include one or more buffers for buffering transmissions between one or more external devices, internal devices, the computing machine, or the processor 320.

The I/O interface 320 can couple the computing machine to various input devices including mice, touch-screens, scanners, electronic digitizers, sensors, receivers, touchpads, trackballs, cameras, microphones, keyboards, any other pointing devices, or any combinations thereof. The I/O interface 320 can couple the computing machine to various output devices including video displays, speakers, printers, projectors, tactile feedback devices, automation control, robotic components, actuators, motors, fans, solenoids, valves, pumps, transmitters, signal emitters, lights, and so forth.

The computing machine 300 can operate in a networked environment using logical connections through the NIC 360 to one or more other systems or computing machines across a network. The network can include wide area networks (WAN), local area networks (LAN), intranets, the Internet, wireless access networks, wired networks, mobile networks, telephone networks, optical networks, or combinations thereof. The network can be packet switched, circuit switched, of any topology, and can use any communication protocol. Communication links within the network can involve various digital or an analog communication media such as fiber optic cables, free-space optics, waveguides, electrical conductors, wireless links, antennas, radio-frequency communications, and so forth.

The processor 310 can be connected to the other elements of the computing machine or the various peripherals discussed herein through the system bus 320. It should be appreciated that the system bus 320 can be within the processor 310, outside the processor 310, or both. According to some embodiments, any of the processors 310, the other elements of the computing machine, or the various peripherals discussed herein can be integrated into a single device such as a system on chip ("SOC"), system on package ("SOP"), or ASIC device.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions unless otherwise disclosed for an exemplary embodiment. Further, a skilled programmer would be able to write such a computer program to implement an embodiment of the disclosed embodiments based on the appended flow charts, algorithms and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the description herein.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A predictive engine for generating optimized multivariate responses, the predictive engine comprising:
   an optimizer configured by a processor to receive an observed dataset having input predictors and multivariate responses and
   select latent response variables, measure dependencies between multivariate responses, estimate coefficients that relate the input predictors to latent response variables and correlate dependencies and coefficients with the latent response variable; and a predictor configured by a processor to generate a predictive distribution of probabilities for the latent variables, map the probabilities to multivariate responses, generate a predictive distribution of probabilities for the multivariate responses, and determine at least one optimized input from the multivariate responses.

2. The predictive engine of claim 1 wherein the dependencies are measured by creating a covariance matrix.

3. The predictive engine of claim 1 wherein the dependencies and coefficients are correlated with the latent response variables using joint posterior density distribution.

4. The predictive engine of claim 1 wherein the optimizer is further configured to:
(i) initialize a latent response variable vector with respect to an input predictor and multivariate response vector;
(ii) measure dependency between a latent response variable and a multivariate response;
(iii) estimate a coefficient that relates an input predictor to the latent response variable;
(iv) correlate the dependency measure and the estimate coefficient with the latent response variable; and
(v) select a latent response variable.

5. The predictive engine of claim 4 wherein the dependency measure and the estimate coefficient is correlated with the latent variable using a joint posterior density distribution.

6. The predictive engine of claim 4 wherein steps (ii)-(v) are repeated until convergence.

7. The predictive engine of claim 1 wherein the multivariate responses are one of multivariate binary responses and multivariate categorical responses.

8. The predictive engine of claim 1 wherein the predictive distribution is a posterior predictive distribution.

9. The predictive engine of claim 1 wherein the probabilities are mapped to the multivariate responses by generating a conditional distribution.

10. A method for generating optimized multivariate responses on a configured processor, the method comprising:
receiving an observed dataset having input predictors and multivariate responses;
determining latent response variables based on the input predictors and the multivariate responses wherein determining includes:
selecting latent response variables;
measuring dependencies between multivariate responses;
estimating coefficients that relate input predictors to determined latent response variables; and
correlating dependencies and coefficients with the latent response variables;
generating a predictive distribution of probabilities for the latent variables;
mapping the probabilities to multivariate responses, generate a predictive distribution of probabilities for the multivariate responses; and
determining at least one optimized input from the multivariate responses.

11. The method of claim 10 further comprising:
(i) initializing a latent response variable vector with respect to an input predictor and multivariate response vector;
(ii) measuring dependency between a latent response variable and a multivariate response;
(iii) estimating a coefficient that relates an input predictor to the latent response variable;
(iv) correlating the dependency measure and the estimate coefficient with the latent response variable; and
(v) selecting a latent response variable.

12. The method of claim 11 wherein steps (ii)-(v) are repeated until convergence.

13. The method of claim 10 wherein the dependencies are measured by creating a covariance matrix.

14. The method of claim 10 wherein the wherein the multivariate responses are one of multivariate binary responses and multivariate categorical responses.

15. A non-transitory computer readable storage medium comprising a set of computer instructions executable by a processor for generating optimized multivariate responses, the computer instructions configured to:
receive an observed dataset having input predictors and multivariate responses;
select latent response variables;
measure dependencies between multivariate responses;
estimate coefficients that relate the input predictors to determined latent response variables;
correlate dependencies and coefficients with the latent response variables;
generate a predictive distribution of probabilities for the latent variables;
map the probabilities to multivariate responses, generate a predictive distribution of probabilities for the multivariate responses; and
determine at least one optimized input from the multivariate responses.

16. The non-transitory computer readable storage medium as recited in claim 15 further including computer instructions configured to:
(i) initialize a latent response variable vector with respect to an input predictor and multivariate response vector;
(ii) measure dependency between a latent response variable and a multivariate response;
(iii) estimate a coefficient that relates an input predictor to the latent response variable;
(iv) correlate the dependency measure and the estimate coefficient with the latent response variable; and
(v) select a latent response variable.

17. The non-transitory computer readable storage medium as recited in claim 16 further including computer instructions configured to repeat steps (ii)-(v) until convergence.

18. The non-transitory computer readable storage medium as recited in claim 15 wherein the dependencies are measured by creating a covariance matrix.

19. The non-transitory computer readable storage medium as recited in claim 15 wherein the multivariate responses are one of multivariate binary responses and multivariate categorical responses.

* * * * *